United States Patent [19]

Grene

[11] Patent Number: 5,141,287
[45] Date of Patent: Aug. 25, 1992

[54] GUIDE FOR A VEHICLE SHOULDER BELT

[76] Inventor: Ethel Grene, 2343 Lake Ave., Wilmette, Ill. 60091

[21] Appl. No.: 667,876

[22] Filed: Mar. 12, 1991

[51] Int. Cl.⁵ .................................... A62B 35/00
[52] U.S. Cl. .............................. 297/483; 297/464; 297/473; 297/485; 297/468
[58] Field of Search ............. 297/483, 464, 473, 485, 297/468; 280/801, 808

[56] References Cited

U.S. PATENT DOCUMENTS

| | | | |
|---|---|---|---|
| 3,513,930 | 5/1970 | Brown | 297/484 X |
| 3,578,383 | 5/1971 | Earl | 297/391 |
| 4,205,670 | 6/1980 | Owens | 297/464 X |
| 4,289,352 | 9/1981 | Ashworth | 297/468 |
| 4,648,625 | 3/1987 | Lynch | 280/808 |
| 4,730,875 | 3/1988 | Yoshitsugu | 297/468 |
| 4,796,919 | 1/1989 | Linden | 297/483 X |
| 4,832,366 | 5/1989 | Corbett et al. | 280/808 |

FOREIGN PATENT DOCUMENTS 54-9157  9/1954  Canada ................. 297/473

*Primary Examiner*—Kenneth J. Dorner
*Assistant Examiner*—Milton Nelson, Jr.

[57] ABSTRACT

A guide is provided for a vehicle shoulder belt so the latter, when in an operative mode, will safely engage the person while sitting in a vehicle seat. The guide includes a first attaching member which removably encompasses a first portion of the back section of the vehicle seat, and a second attaching member which is angularly disposed relative to and intersects the first attaching member. The second attaching member removably encompasses a second portion of the seat back section. Carried by the first attaching member and disposed to the side of the seat back section, which is proximate the shoulder belt, is a guide piece. The guide piece is in sliding engagement with a portion of the shoulder belt. The second attaching member has a portion thereof affixed to an intersecting portion of the first attaching member. The second attaching member is adjustable relative to the seat back section so as to position the first attaching member and the guide piece carried thereby at a selected elevated location on the seat back section whereby the shoulder belt, when in an operative mode, will safely engage the upper torso region beneath the neck region of the seated person.

8 Claims, 1 Drawing Sheet

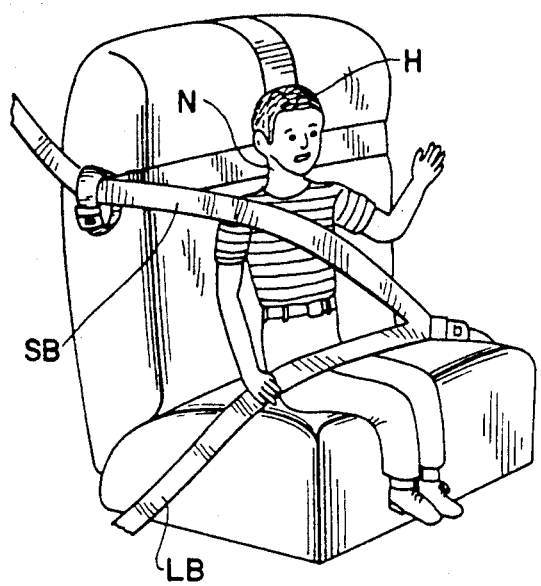
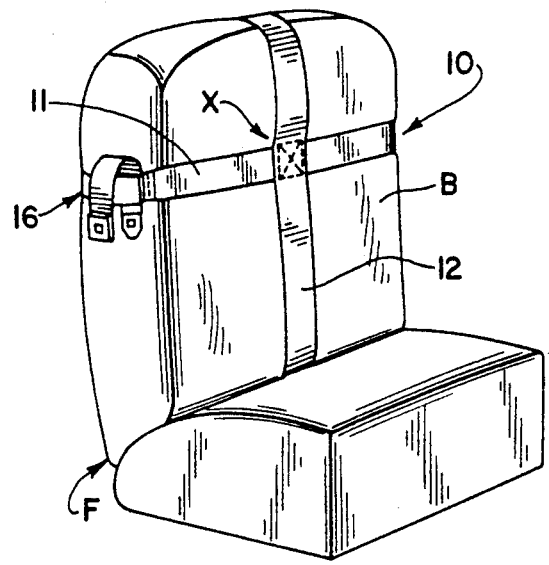
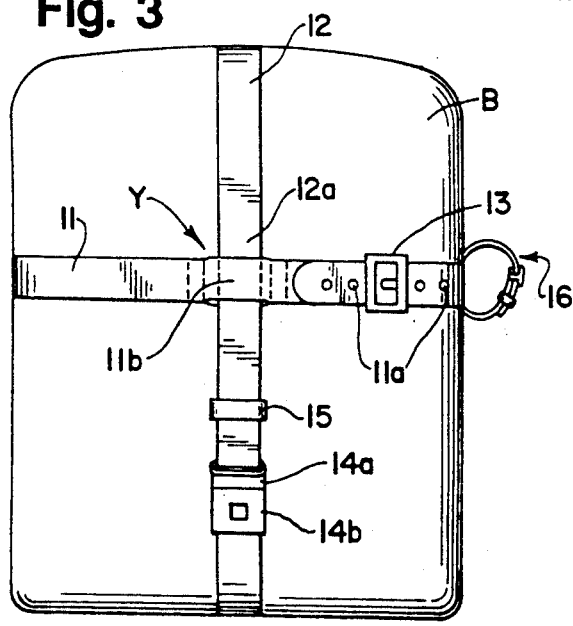
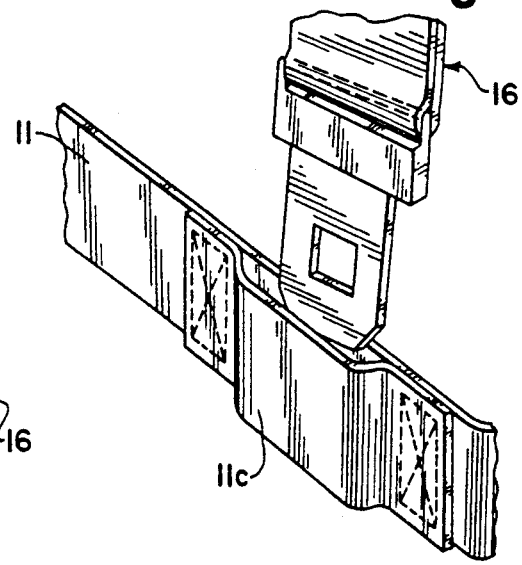
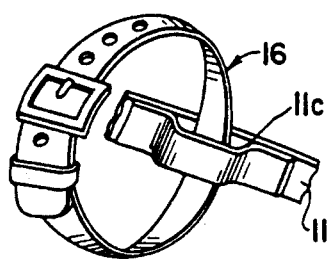

GUIDE FOR A VEHICLE SHOULDER BELT

BACKGROUND OF THE INVENTION

The use of standard vehicle safety belts, such as shoulder and lap belts, for persons of short stature and particularly children between the ages of four to ten poses a safety problem with regard to the shoulder belt when it is in an operative mode. When in such a mode, it will normally be at an incorrect level with respect to such person whereby the belt will extend across the face and/or neck region of the seated person creating an uncomfortable and dangerous condition. As a result of this condition, the shoulder belt is oftentimes rendered ineffective by either interposing the belt between the seat back section and the dorsal torso region of the seated person or by causing the shoulder belt, when it is independent of the lap belt, to be unbuckled. In either case the person is restrained by the lap belt alone which allows excessive forward motion of the person's head, neck and upper torso regions when there is a collision or sudden stop of the vehicle resulting in injuries both external and internal in such areas. Furthermore, when such collision or sudden stop occurs, the entire momentum of the body due to the forward thrust thereof causes the lap belt to impinge on the person's lower torso region resulting in trauma and frequently serious internal injuries to the intra-abdominal viscera such as intestines and other adjacent organs.

SUMMARY OF THE INVENTION

Thus, a guide is provided which is readily attached to the back section of a vehicle seat where the front and back surfaces of the back section are accessible and allows the standard vehicle shoulder belt, when in an operative mode, to engage a seated person of short stature at the proper level and thereby comfortably and safely retain the person against the seat back section.

The guide is of simple, lightweight and inexpensive construction and may be readily carried by the person for use in a variety of vehicles wherein the seat back section thereof has accessible front and back surfaces.

The guide may be easily adjusted relative to the vehicle seat back section so that the standard vehicle shoulder belt may be comfortably and safely utilized by persons of short stature whose physical dimensions vary over a wide range.

The guide may be quickly and easily installed without the need for tools and without defacing or damaging the interior of the vehicle.

The guide, when installed, does not interfere with normal operation of the standard vehicle safety belts.

Further and additional advantages of the guide will become apparent from the description, accompanying drawing and appended claims.

In accordance with one embodiment of the invention a guide for a vehicle shoulder belt is provided for use by persons of short stature wherein when the belt is in an operative mode it will comfortably and safely retain the person against the back section of the vehicle seat. The guide includes a flexible first attaching means which removably encompasses an upper portion of the seat back section, and a flexible second attaching means which is angularly disposed with respect to the first attaching means and removably encompasses a central portion of the seat back section. The first and second attaching means are disposed in a cruciform relation. A portion of the second attaching means intersects and is fixedly connected to the first attaching means and engages a front surface of the seat back section. The second attaching means is selectively adjustable relative to the seat back section to effect a predetermined elevated position of the first attaching means with respect to the bottom section of the vehicle seat. A guide piece is carried by the first attaching means and is disposed to the side of the seat back section which is adjacent the vehicle shoulder belt. The guide piece is adapted to be in sliding engagement with the shoulder belt when the latter is in an operative mode, and thus, directs the shoulder belt to a position wherein it comfortably and safely engages beneath the neck region the upper torso region of the seated person and retains the latter against the front surface of the seat back section.

DESCRIPTION

For a more complete understanding of the invention reference is made to the drawing wherein:

FIG. 1 is a fragmentary perspective front view of one embodiment of the guide attached to the back section of a vehicle seat occupied by a person of small stature and showing the standard vehicle safety belts in an operative mode.

FIG. 2 is similar to FIG. 1 but without the seated person and vehicle safety belts.

FIG. 3 is a rear elevational view of FIG. 2.

FIG. 4 is an enlarged fragmentary perspective view showing one form of guide piece being assembled with the first attaching means.

FIG. 5 is a fragmentary perspective view of a second form of guide piece assembled with the first attached means.

Referring now to the drawings and more particularly to FIGS. 1-3, one embodiment of a guide 10 is shown which is used in combination with a shoulder belt SB of conventional design. The shoulder belt and a lap belt LB are normally standard equipment in present model vehicles (i.e., automobiles) and are provided for both the driver and one, or more, front seat passenger. In many instances a shoulder belt and lap belt combination is provided for each rear seat passenger as well. The design and shape of the shoulder belt and lap belt may vary depending upon the make and model of the vehicle, but in each instance such belts are intended to accommodate an average size adult. Where, however, the person seated in the vehicle is of short stature, not more than about 5 feet, or is a child of about 4 to about 10 years of age, the location or level of the shoulder belt, when in the operative mode, relative to the seated person is improper and can create an uncomfortable and unsafe condition. Children in the 4 to 10 year range are normally of such physical size that they have outgrown the conventional infant car seat and thus, when they sit on the vehicle seat, without the infant car seat, the shoulder belt, when in the operative mode, will overlie the person's head (face) and neck region before reaching the intended level of his/her shoulder and anterior torso. Because of the discomfort experienced and the perceived risk involved when the shoulder belt is so positioned it is not uncommon that both the shoulder belt and lap belt are left unbuckled, or the buckled shoulder belt is positioned behind the seated person. In the latter situation the seated person is retained in the vehicle seat by the lap belt alone with the result that when the vehicle makes a sudden or abrupt stop, the person's upper torso region including the head and neck may be violently thrown forward causing possible head or neck or other bodily injury. Simultaneously with the pivotal movement of the upper torso region, the entire momentum of the body due to the forward thrust thereof causes the lap belt to severely impinge upon the lower torso region inflicting pain and oftentimes serious internal injury.

The guide 10 to be hereinafter described, remedies this situation by directing the standard shoulder belt SB when in the operative mode, so that it does not engage the head H, or neck region N of the person, but instead overlies the upper torso region in a comfortable and safe manner, see FIG. 1. As seen in FIGS. 2 and 3, the guide 10 includes a first attaching member 11 which horizontally encompasses the upper portion of a back section B of the vehicle seat F, and a second attaching member 12 which is substantially perpendicular to member 11 and vertically encompasses a central portion of the back section B. Both members 11 and 12 may be formed of flexible webbing material similar to that used for the shoulder belt SB and lap belt LB. It is important when attaching the members 11 and 12 to the seat back section B, that both the front and back surfaces thereof be accessible. Such is the case with a divided front seat of a conventional automobile and middle seats of a stationwagon or van. Both members 11 and 12 are provided with lock components which enable the members to be readily removed from the seat back section B when desired. Two forms of lock components are shown in FIG. 3. For example, member 11 has one end thereof provided with a conventional belt buckle 13 and the other end is provided with a plurality of longitudinally spaced holes 11a. Member 12, on the other hand, includes complemental male and female lock components 14a and 14b which are mounted on opposite ends of member 12. Components 14a, 14b may be of the type commonly utilized on lap belts and/or shoulder belts. The type of locking means utilized on attaching members 11 and 12 may vary as desired. Each member is provided with means of adjusting the longitudinal dimension thereof so that each member snugly encompasses the seat back section. Where the conventional belt buckle 13 is utilized, the longitudinal adjustment is accomplished by the number and spacing of the holes 11a. With lock components 14a, 14b a separate length adjusting clip 15 of conventional design may be utilized.

As seen in FIG. 2, attaching members 11 and 12 are arranged in a substantially cruciform relation and at the point of intersection X on the front surface of the back section they are affixed to one another by stitching or the like. On the back surface of the seat back section B, the members 11 and 12 intersect one another at Y; however, the members are not affixed to one another, but instead a portion 12a of member 12 slidably extends through a loop 11b formed in member 11. Thus, by reason of the loop, the elevation of the first attaching member 11 can be changed by moving up or down the intersection X of the members on the front surface of the seat back section. The proper elevated position of member 11 on the back section will be determined by the trunk or torso length of the person sitting on the seat F.

A guide piece 16 in the form of a hoop is carried by attaching member 11 and is disposed on the side of the seat back section B which is closest to the shoulder belt SB. The piece 16 may be formed of flexible webbing material, or a plastic or metal ring, either of which may be opened so as to allow the shoulder belt to pass therethrough. The guide piece 16 extends through a suitable loop 11c formed in member 11 which allows the piece to be readily adjusted when closing the piece around the shoulder belt. The piece should loosely embrace the shoulder belt so that the latter can slide relative to the piece in response to the normal movement of the seated person.

If desired, member 11 may be provided with a third loop, not shown, which is like loop 11c but disposed on the opposite side of the seat back section. Thus, the guide 10 may be utilized on the back section of either a right side or left side seat (e.g. driver or front passenger seat).

A guide, as afore-described, has been provided which enhances the comfort and safety of a shoulder belt when utilized by a person of short stature. The guide is of simple, inexpensive, lightweight and transportable construction, does not interfere with the operation of the shoulder belt and lap belt standard on most current model vehicles, and can be readily attached to the seat back section without the need for tools.

I claim:

1. A portable guide for a vehicle shoulder belt to effect proper positioning of the belt, when in an operative mode, on a person of short stature sitting on a bottom section of a vehicle seat, the latter having a side thereof adjacent a fixed mounting for the shoulder belt, said guide comprising a first attaching means for removably encompassing in a substantially horizontal plane a first portion of an upright back section of the vehicle seat; a second attaching means angularly disposed relative to said first attaching means and intersecting the same at at least two locations, and said attaching means being affixed to one another at at least one of said locations, said affixed portion being adapted for disposition against an upright surface of the back section, said second attaching means being adapted to removably encompass in a substantially vertical plane a second portion of the vehicle seat back section and being adjustable relative thereto to effect a predetermined elevated position of said first attaching means, when in a back section-encompassing mode, restraining lateral shifting of said second attaching means with respect to the seat back section; and a guide piece carried by said first attaching means for disposition on a side of the seat back section adjacent the vehicle shoulder belt mounting and away from a front upright surface of the seat back section, said guide piece being adapted to be in sliding engagement with the vehicle shoulder belt whereby the latter, when in an operative mode, engages diagonally an upper torso region beneath a neck region of the seated person retaining the upper torso region against the front upright surface of the seat back section.

2. The guide of claim 1 wherein the guide piece defines at least one loop through which a portion of the vehicle shoulder belt is adapted to extend when the belt is in an operative mode.

3. The guide of claim 2 wherein the guide piece is formed of a strip of webbing material, said strip being provided with means for opening and closing the loop defined by said strip.

4. The guide of claim 1 wherein the first and second attaching means are arranged in substantially cruciform relation and formed of flexible webbing material.

5. The guide of claim 4 wherein each attaching means includes locking means, said locking means, when in a locking mode being adapted to be disposed adjacent a back upright surface of the vehicle seat back portion.

6. The guide of claim 4 wherein each attaching means is provided with releasable means for retaining said attaching means in a snug encompassing relation with the seat back section.

7. The guide of claim 4 wherein the first and second attaching means intersect substantially perpendicularly to one another at at one location being adapted to be disposed adjacent the front upright surface of the seat back section and the second location being adapted to be disposed adjacent a back upright surface of the seat back section.

8. The guide of claim 7 wherein the first and second attaching means are affixed to one another at only one of the two locations.

* * * * *